(12) United States Patent
van Bemmel

(10) Patent No.: US 7,920,844 B2
(45) Date of Patent: Apr. 5, 2011

(54) METHOD OF PROVIDING CONTEXT INFORMATION FOR A MOBILE DEVICE

(75) Inventor: Jeroen van Bemmel, Zuid Holland (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1381 days.

(21) Appl. No.: 11/363,480

(22) Filed: Feb. 27, 2006

(65) Prior Publication Data

US 2007/0202876 A1    Aug. 30, 2007

(51) Int. Cl.
*H04M 11/04* (2006.01)
*H04W 36/00* (2009.01)

(52) U.S. Cl. .................................. 455/404.2; 455/440

(58) Field of Classification Search ............... 455/404.2, 455/432.1, 440, 443, 456.1
See application file for complete search history.

(56) References Cited

U.S. PATENT DOCUMENTS

| | | | |
|---|---|---|---|
| 6,385,454 B1* | 5/2002 | Bahl et al. | 455/450 |
| 2004/0103291 A1* | 5/2004 | Craft | 713/193 |
| 2004/0104841 A1* | 6/2004 | Syrjarinne | 342/357.13 |

* cited by examiner

*Primary Examiner* — Lester Kincaid
*Assistant Examiner* — Joel Ajayi
(74) *Attorney, Agent, or Firm* — Carlson, Gaskey & Olds, P.C.

(57) ABSTRACT

A method of providing context information regarding a mobile station includes using cell transitions as an input to a context determining algorithm. A disclosed example includes Bloom filter theory that utilizes a key based upon an indication of the cells involved in the transition and a selected number of hash functions. The bit strings resulting from operation of the hash functions are compared to information stored in a database that relates hash function results to context information. In a disclosed example, the entire process for determining the context information is carried out on the mobile station itself.

12 Claims, 1 Drawing Sheet

METHOD OF PROVIDING CONTEXT INFORMATION FOR A MOBILE DEVICE

FIELD OF THE INVENTION

This invention generally relates to communications. More particularly, this invention relates to context information for mobile devices used for wireless communications.

DESCRIPTION OF THE RELATED ART

Wireless communication systems are well known. Typical arrangements include mobile stations such as cell phones, personal digital assistants or portable computers (e.g., laptop or notebook computers) that allow an individual to wirelessly communicate by accessing a wireless network. Providers of wireless communication services are always striving to enhance capabilities of their systems to provide customers with more features or enhanced service.

One trend in advancing wireless communication systems includes adding personalization and automation features that are useful for tailoring services for end-user needs. One example is to include "presence" information that describes the current state and willingness of a person to engage in wireless communications using a particular mobile device. If detailed information about a target callee is provided, for example, a potential caller can make a better-informed decision about when and how to contact that person. For example, a potential caller may see that the intended callee is currently traveling in a car and the caller may decide not to place a voice call under those circumstances.

There are well established IETF standards regarding presence information (e.g., SIP (RFC3261) and associated presence extensions). One feature of current systems is that a user must manually enter or select information about their current status or location. Manually entering or updating context information is tedious and most users tend not to use this feature. It is desirable to provide the capability for automatically determining information about the context to remove the burden of manually providing such information.

One proposal in this regard has been to associate a context or event with a certain cell. Cell IDs in a mobile network have been used to determine the location of a mobile station. Such a location may be associated with other context information. For example, a particular user's home may be located within a particular cell and when the mobile station is within that cell, the context information can indicate that the user is at home. One drawback associated with this approach is that cells cover geographic regions that are relatively large. For example, a cell may have a range equivalent to a five kilometer diameter. Therefore, using a cell ID as a basis for context information provides a rough estimate and a relatively inaccurate method of providing context information.

An additional drawback associated with basing context information purely on a cell ID is that storing information about all cells in a network requires significant memory, which is not readily available on typical mobile stations. A look-up approach that uses a backend server to avoid storing the information at the mobile station requires air communication, which of course requires connectivity and typically results in a charge to the user.

There is a need for a better, simpler and automated way of providing context information for a mobile station. This invention addresses those needs and provides a technique for determining the context of a mobile station to enhance available presence information.

SUMMARY OF THE INVENTION

An exemplary method of indicating a context of a mobile station includes using a transition between cells for determining context information regarding the mobile station.

In one example, the transition between cells includes a previous cell within which the mobile station was located and a new cell within which the mobile station is current located. In such an example, the method includes establishing a key using an indication of the previous cell and an indication of the new cell. The key is then used in a selected number of hash functions, respectively. The result of the hash functions is then compared to a database that includes relationships between hash function results and context information.

In one example, the database is preset by a provider of wireless communication services. In another example, the database is at least partially customized by a user of a mobile station to provide more particular context information for that user.

The various features and advantages of this invention will become apparent to those skilled in the art from the following detailed description. The drawings that accompany the detailed description can be briefly described as follows.

DETAILED DESCRIPTION

This invention allows for determining context information regarding a mobile station based on a transition from one cell to another cell. This transition is used as an input to a look up process that can be executed on the mobile station. A disclosed example includes a compact database that represents a mapping from cell transitions to associated context information. Depending on the contents of the database, the context information can be determined at a high level or a more detailed level.

Figure 1:
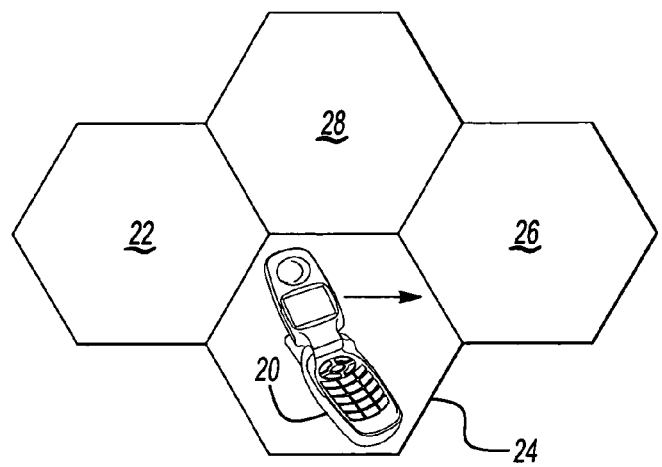
FIG. 1 schematically illustrates an example scenario in which an embodiment of this invention is useful.

FIG. 1 schematically shows a mobile station 20 and a plurality of cells schematically shown at 22, 24, 26 and 28. Assuming that the mobile station 20 is moving as shown by the arrow in FIG. 1, it would have recently transitioned from the cell 22 to the cell 24. As the mobile station 20 makes this transition, context information regarding the mobile station 20 can be determined.

Figure 2:
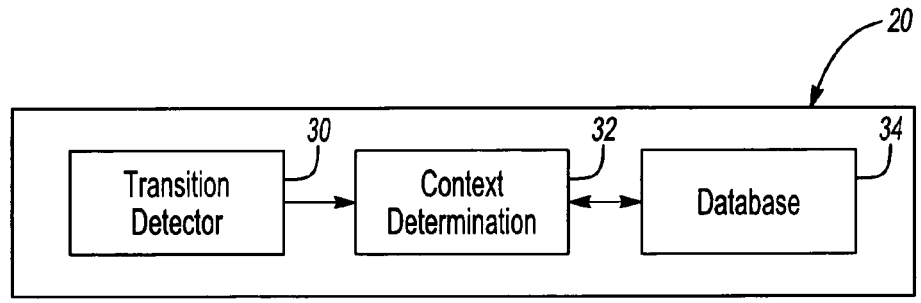
FIG. 2 schematically illustrated selected portions of a mobile station that is useful with an embodiment of this invention.

FIG. 2 schematically shows selected portions of an example mobile station 20. In this example, a transition detector portion 30 is capable of detecting the transition between the cells 22 and 24, for example. In one example, such a transition is detected by determining when a cell ID changes. There are known techniques by which mobile stations detect a cell ID indicating the cell in which they are located. The illustrated example includes a transition detector portion 30 that uses known techniques for determining when the mobile station 20 has transitioned from being located within one cell to another cell.

The example of FIG. 2 also includes a context determination portion 32 that operates responsive to a detection of a transition between cells. The context determination portion 32 utilizes information regarding the detected transition and information stored in a database 34 for determining current context information such as a status of the mobile station 20. In this example, the entire process of determining the context of the mobile station 20 occurs within the mobile station 20.

Figure 3:
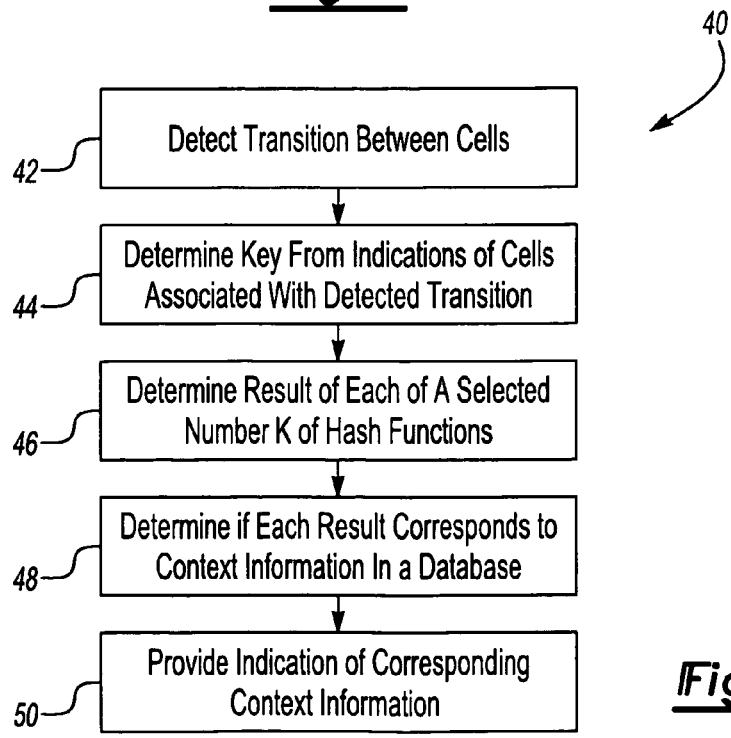
FIG. 3 is a flowchart diagram summarizing one example approach.

Referring to FIG. 3, a flowchart diagram 40 summarizes one example approach. The transition between cells is detected at 42. At 44, the context determination portion 32 determines a key using indications of the cell that the mobile station 20 just left (e.g., the old cell) and the cell in which the mobile station 20 is currently located (e.g., the new cell). In one example, a commutative operator is used for determining the key by applying the commutative operator to the indications of the old cell and the new cell. In one example, the key is calculated from the relationship key:=old_cell*new_cell.

Another example includes an ability to provide directional information as part of the context information. For such an example, a non-commutative operator is used for establishing the key. The non-commutative operator signifies concatenation of its operands (e.g., K:=cell_old:cell_new). With this approach a cell transition from the cell 22 to the cell 24 will map differently onto the database corresponding to the context information than a cell transition from cell 24 to cell 22. This allows for indicating a direction of travel (e.g., west) in addition to an indication that a mobile station is traveling along a particular highway, for example.

At 46, the result of each of a selected number K of hash functions is determined based upon the key. The key determined at 44 is input into K hash functions. K is an integer and is selected based upon a desired accuracy of the context determination process. In one example, more hash functions corresponds to higher accuracy by reducing the chance of false positive occurrences. In other words, situations where more accuracy is desired include more hash functions (e.g., a higher value of K) compared to situations where lesser accuracy is acceptable. In one example, the hash functions include multiplication with a prime number and then modulo the number of bits. Given this description, those skilled in the art will be able to select appropriate hash functions and appropriate numbers of them to meet the needs of a particular situation.

Once the hash functions have been processed, the result of each one is used at 48 to determine whether it corresponds to context information in the database 34. In one example, the result of each hash function is a bit string such as 000001100110101110. The data base 34 in one example includes a number of entries corresponding to bit strings that are expected to result from application of the hash functions. The example bit string may correspond to context information in the data base 34 indicating that the mobile station 20 is currently on a highway.

In one example, all of the bit strings resulting from application of all of the hash functions are filtered and if all of the resulting bit strings are set in the filter, then the associated context information from the database 34 is reported as valid. FIG. 3 includes a step at 50 for providing the indication of the corresponding context information determined from the database 34 as a result of applying the hash functions and using the key that is based upon the indications of the old cell and the new cell. The technique for actually indicating the context information will depend upon the needs of a particular situation and those skilled in the art who have the benefit of this description will understand what techniques to apply to meet their particular needs.

One example includes using Bloom filter theory, which is known. Developing one example database 34 includes first determining a set of cell transitions that correspond to a particular condition. For example, if a mobile station owner is driving along a highway, the mobile station records all cell IDs that are seen along that highway as C1, C2, C3, C4 ... CN. Then, C1*C2, C2*C3, C3*C4, etc., are added as transitions. Each transition (e.g., pair of cell IDs) is hashed using the same hash functions as used for looking up context information. The resulting bits for all pairs are combined using an OR function.

Bloom filters are then aggregated by bitwise ORing the bit strings. In this example, the context information regarding the condition "is driving" can be determined by ORing the bit strings corresponding to conditions "is on road A1," "is on road A2," etc.

In one example, a provider of mobile stations or a wireless communication service provider creates the database and presents associated context descriptions corresponding to the entries in the database. In one example, a mobile station owner (e.g., a mobile subscriber) can customize the database by creating new entries or modifying a context description associated with existing or newly created entries.

The length of the resulting Bloom filter bit string can be chosen according to the desired chance at false positive occurrences. One advantage to using a Bloom filter in an embodiment of this invention is that a large key set (e.g., all possible transitions between cells within a given region such as a country) can be represented very efficiently in a small number of bits. For example, achieving a 0.01% chance at false positives in one example includes storing 10,000 cell transitions corresponding to a certain context and this requires about 37.4 KB of memory.

As can be appreciated from the above description, this invention includes a unique approach to providing context information for a mobile station. The disclosed example uses transitions between cells instead of relying solely on a current cell ID as a basis for determining context information. One advantage to the disclosed example is that it provides an efficient way to use cell transition information as an index into a compactly stored database. The disclosed example provides parameterized precision and accuracy and does not require communication with an external system.

The disclosed example is simple and efficient for providing a determination of context information. A mobile station used with the disclosed example can be loaded with any database and the information can be tailored to context information for a particular situation. There is no requirement for communication with a backend server. Large amounts of context information can be efficiently stored on a mobile station, within the typically limited resources for such purposes.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of indicating a context of a mobile station, comprising the steps of:

using a transition between cells for determining context information regarding the mobile station, wherein the transition between cells includes a previous cell within which the mobile station was located and a new cell within which the mobile station is currently located;

establishing a key by applying a selected operator to an indication of the previous cell and an indication of the new cell;

determining a result of a selected number of hash functions, respectively, using the established key as an input for each of the hash functions;

determining which of a plurality of database sets has a set of hash function results corresponding to the determined results of the hash functions; and determining the context information from the determined database set.

2. The method of claim 1, wherein the database is arranged by at least one of a provider of the mobile station or a provider of wireless communication services for the mobile station.

3. The method of claim 1, comprising customizing at least one portion of the database or at least one resulting indication from using the database by incorporating data from a user of the mobile station.

4. The method of claim 1, comprising selecting the number of hash functions based on a desired accuracy for determining the context information where a greater number of hash functions corresponds to a greater accuracy.

5. The method of claim 1, wherein the selected operator comprises a commutative operator.

6. The method of claim 1, wherein the selected operator comprises a non-commutative operator that concatenates the indication of the previous cell and the indication of the new cell; and the context information comprises an indication of a direction of movement of the mobile station.

7. The method of claim 1, wherein the context information comprises an indication of a status of the mobile station.

8. The method of claim 1, wherein the determined key is distinct from the indication of the previous cell and distinct from the indication of the new cell.

9. A mobile station useful for wireless communications, comprising:

a detector portion that detects when the mobile station transitions from a first cell to a second cell;

a database containing sets of hash function outputs, each set corresponding to context information; and a context determination portion that determines context information regarding the mobile station from a transition detected by the detector portion, the context determination portion being configured to:

determine a key by applying a selected operator to an indication of the first cell and an indication of the second cell;

use the determined key as an input into a plurality of hash functions;

determine an output of each of the hash functions;

determine which of the database sets corresponds to the determined output of the hash functions; and determine the context information from the determined database set.

10. The mobile station of claim 9, wherein the determined key is different than the indication of the first cell and different than the indication of the second cell.

11. The mobile station of claim 9, wherein the selected operator is a commutative operator and the determined key has a value that results from a commutative operation involving the indication of the first cell and the indication of the second cell.

12. The mobile station of claim 9, wherein the selected operator comprises a non-commutative operator and the key comprises a value based upon the indication of the first cell concatenated with the indication of the second cell.

\* \* \* \* \*